Oct. 17, 1933.  G. R. GOLDTHWAITE  1,930,971
MOTOR SUSPENSION
Filed March 12, 1931   2 Sheets-Sheet 1

Witness
Paul F. Bryant

Inventor
George R. Goldthwaite
by his attorneys
Van Everen, Fish, Hildreth & Cary Patented Oct. 17, 1933

1,930,971

UNITED STATES PATENT OFFICE 1,930,971

MOTOR SUSPENSION

George R. Goldthwaite, Readville, Mass., assignor to B. F. Sturtevant Company, Hyde Park, Mass., a corporation of Massachusetts Application March 12, 1931. Serial No. 521,943

2 Claims. (Cl. 248—16)

The present invention relates to motor suspensions, and more particularly to motor suspensions for motors designed especially for the direct driving of fans in ventilating apparatus.

One of the objects of the present invention is to provide a motor suspension of simple design and inexpensive construction which will serve adequately to support a motor and its fan in operation.

Another object of the invention is to provide a bearing suspension which will absorb starting torques and the vibrations set up by the motor and fans in operation, thus substantially eliminating noise and hum.

With these and other objects in view as will be apparent to one skilled in the art, the present invention consists of the device hereinafter described and claimed.

Figure 1:
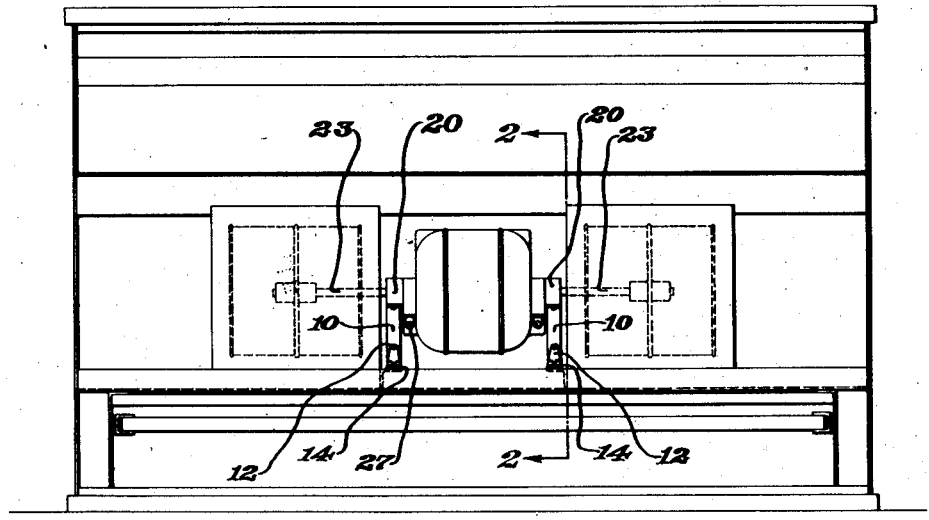
Figure 2:
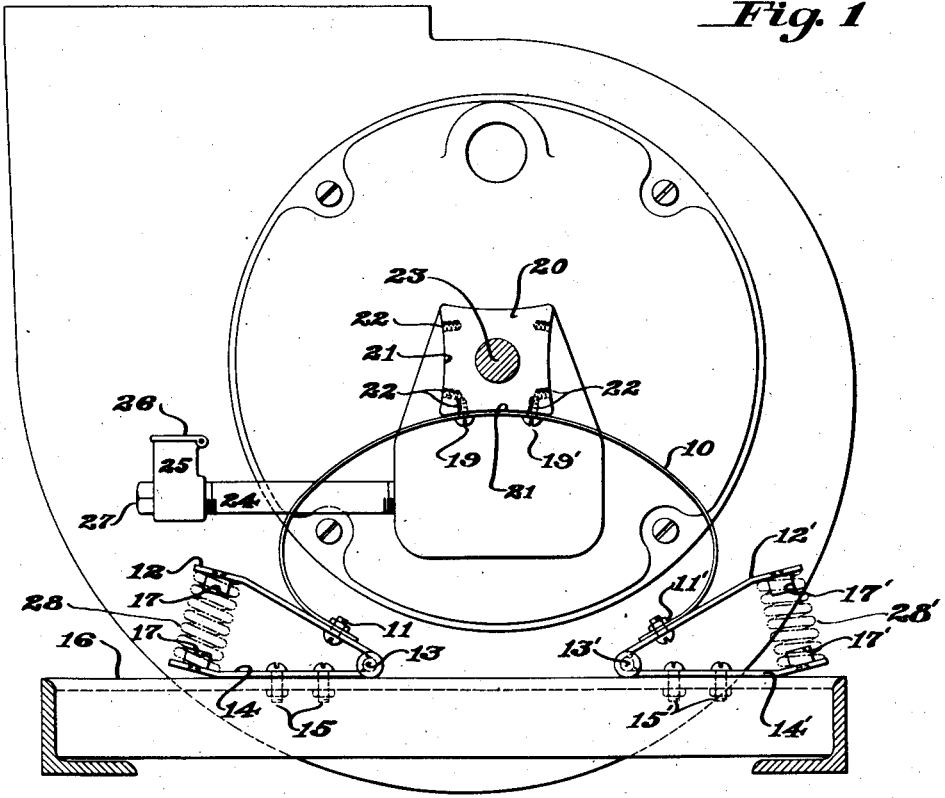

The invention in its preferred form is illustrated in the accompanying drawings in which Fig. 1 is a front elevation of a motor and fans mounted upon the suspension in a ventilating device; Fig. 2 is a side elevation along the section 2—2 of Fig. 1; Fig. 3 is a side plan view of the suspension attached to a vertical support with a motor hung therefrom, and Fig. 4 is a side plan view of a motor mounted upon a simplified form of the invention.

The device illustrated in the drawings of Figs. 1, 2 and 3, which show one-half of the suspension, comprises an overhung three-quarter loop spring 10 rigidly attached at its ends by bolts and nuts 11 to the members 12 which are pivotally mounted at 13 upon the metal plates 14 attached by bolts 15 and nuts to the support 16. These plates 14 and the members 12 are provided with bosses 17, to receive the spiral springs 28 shown in dotted outline, the purpose of which will later be described. Attached by the attaching surface 21 upon the top portion of the spring 10 at the point of greatest flexibility, and held thereto by bolts 19 is the motor bearing 20 which is cast en bloc with the end plate of the motor frame. The motor bearing is provided with additional attaching surfaces 21 and bolt holes 22 to receive bolts to permit the attachment of the motor to the suspension as illustrated in Figs. 2 and 3. Within the bearing 20 is the motor shaft 23.

Into the bearing 21 is screwed the oil conduit 24 provided with the oil cup 25 and its cover 26. The side of the oil cup is provided with a threaded hole closed by the plugs 27, which may be removed, thus permitting the cleaning of the oil conduit.

When the motor is mounted upon the suspension as in Fig. 2, the forces acting downwardly upon the spring are symmetrically distributed, and the forces acting upon the pivots 13 are substantially identical. Under such conditions the device as illustrated in Fig. 2, but without the spiral springs (shown in dotted outline) is adequate. When the motor is hung from the suspension attached to a vertical support as is illustrated in Fig. 3, the forces acting upon the suspension are not symmetrically disposed, and the forces acting upon the pivots 13 differ in amount and direction, for the force upon the upper pivot is one of tension while the force upon the lower pivot is one of compression. In a suspension of this kind, a spiral coil spring 28 is inserted between the bosses 17 to relieve the lower pivot and the lower portion of the three-quarter loop spring of some of the stress created by the weight of the motor and fans. A tension spring 28' may be inserted between and tied to the bosses 17', thus serving to relieve the upper pivot 13' of some of the force of tension.

Fig. 4 illustrates a simplified embodiment of the invention. In this form, the overhung three-quarter loop spring 10 is pivotally mounted at 13 directly upon the metal plates 14 attached by bolts and nuts 15 to the support 16. The modification is essentially suited to the positioning of the motor and fans in the position indicated, while the preferred embodiment of the invention as illustrated by Fig. 2 is suited to the positioning of the motor and fans either upon, or hung from the suspension.

The mode of operation of the invention is as follows: The motor and fans are mounted upon the suspension and fixed thereupon by the bolts 19 and 19'. The motor circuit is then closed. The vibrations due to the motor and to any imperfection in the balancing of the fan blades are communicated to the overhung three-quarter loop spring, presumably setting up transverse waves and longitudinal oscillations therein. From experimental results, the conclusion follows that whatever may be the character of these waves and oscillations, they are effectively damped out when they reach the portion of greatest curvature of the three-quarter loop overhung spring, for they do not communicate any substantial amount of energy to the pivots 17 and thence to the support 16. The result of the use of this invention is the almost complete elimination of all sound of operation.

While the present invention has been shown and described as embodied in a suspension for electric motors, it is to be understood that it is not necessarily limited thereto, but may be embodied in other devices and apparatus of analagous character when it is desired to eliminate objectionable noise or vibration. When in the claims the term "motor" is employed, this is to be understood to include such other device or apparatus.

Having thus described the invention, what I claim is:

1. In combination with an electric motor having a pair of spring-receiving seats spaced apart in the direction of the axis of the shaft of the motor, a support, and means for resiliently suspending said motor on said support embodying a pair of leaf springs arranged at right angles to the shaft of the motor, one at each end of the motor, each of said leaf springs being of the three-quarter loop type affixed midway its length to its companion spring-receiving seat and having its free ends curved inwardly toward each other and pivotally connected to said support at a fixed distance apart.

2. The structure recited in claim 1, the connection of each of the ends of the spring to the frame embodying a bar projecting outwardly beyond the curved end of the spring, and a coil spring interposed between the outer end of this bar and the support whereby when the motor is mounted so that the leaf springs shall be in a vertical position one pair of these coil springs will act as compression springs.

GEORGE R. GOLDTHWAITE.